US009538297B2

(12) United States Patent
Hazrati et al.

(10) Patent No.: US 9,538,297 B2
(45) Date of Patent: Jan. 3, 2017

(54) ENHANCEMENT OF REVERBERANT SPEECH BY BINARY MASK ESTIMATION

(71) Applicants: The Board of Regents of the University of Texas System, Austin, TX (US); Demetria Loizou, Plano, TX (US)

(72) Inventors: Oldooz Hazrati, Dallas, TX (US); Philipos C. Loizou, Plano, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 18 days.

(21) Appl. No.: 14/536,344

(22) Filed: Nov. 7, 2014

(65) Prior Publication Data

US 2015/0124987 A1 May 7, 2015

Related U.S. Application Data

(60) Provisional application No. 61/901,061, filed on Nov. 7, 2013.

(51) Int. Cl.

| | |
|---|---|
| ***H04B 3/20*** | (2006.01) |
| ***H04R 25/00*** | (2006.01) |
| *G10L 21/0208* | (2013.01) |

(52) U.S. Cl.
CPC ... *H04R 25/453* (2013.01); *G10L 2021/02082* (2013.01)

(58) Field of Classification Search
CPC .................... H04R 25/453; G10L 2021/02082
USPC .......................................................... 381/66
See application file for complete search history.

(56) References Cited

U.S. PATENT DOCUMENTS

2014/0270216 A1* 9/2014 Tsilfidis ................. H04R 3/002 381/66
2015/0043742 A1* 2/2015 Jensen ................. H04R 25/554 381/66

* cited by examiner

*Primary Examiner* — Paul S Kim
(74) *Attorney, Agent, or Firm* — Winstead PC

(57) ABSTRACT

The invention is directed to a single channel mask estimation method capable of improving reverberant speech identification for CI users. The method is based on the energy of the reverberant signal and the residual signal computed from linear prediction (LP) analysis. The mask is estimated by comparing the energy ratio of the two signals at different frequency bins with an adaptive threshold. As the threshold is updated for each frame of speech based on the energy ratios of the reverberant and LP residual signals computed from previous frames, it is amenable for real-time implementation. It can thus be used as a specialized (for reverberant environments) sound coding strategy used for cochlear implant applications.

6 Claims, 1 Drawing Sheet

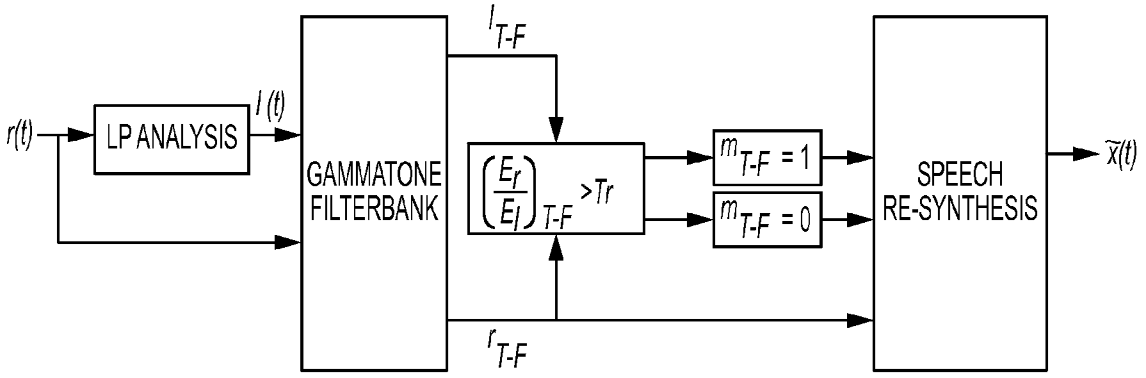
r(t)
LP ANALYSIS
l (t)
GAMMATONE FILTERBANK
l T-F
(Er / El) T-F > Tr
m T-F = 1
m T-F = 0
r T-F
SPEECH RE-SYNTHESIS
x̃(t)

ENHANCEMENT OF REVERBERANT SPEECH BY BINARY MASK ESTIMATION

CROSS-REFERENCES TO RELATED APPLICATIONS

This Application claims the benefit under 35 U.S.C. §119(e) of U.S. Patent Application No. 61/901,061 filed Nov. 7, 2013, which is incorporated herein by reference in its entirety as if fully set forth herein.

STATEMENT REGARDING FEDERALLY-SPONSORED RESEARCH OR DEVELOPMENT

This invention was made with government support under Grant No. R01-DC010494 awarded by the National Institutes of Health. The government has certain rights in the invention.

BACKGROUND OF THE INVENTION

Reverberation severely degrades speech intelligibility for cochlear implant (CI) users. The ideal reverberant mask (IRM), a binary mask for reverberation suppression which is computed using signal-to-reverberant ratio, was found to yield substantial intelligibility gains for CI users even in highly reverberant environments (e.g., $T_{60}$=1.0 s). Motivated by the intelligibility improvements obtained from IRM, a monaural blind channel-selection criterion for reverberation suppression is proposed. The proposed channel-selection strategy is blind, meaning that prior knowledge of neither the room impulse response (RIR) nor the anechoic signal is required. By the use of a residual signal obtained from linear prediction analysis of the reverberant signal, the residual-to-reverberant ratio (RRR) of individual frequency channels was employed as the channel-selection criterion. In each frame, the channels with RRR less than an adaptive threshold were retained while the rest were zeroed out. Performance of the proposed strategy was evaluated via intelligibility listening tests conducted with CI users in simulated rooms with two reverberation times of 0.6 and 0.8 s. The results indicate significant intelligibility improvements in both reverberant conditions (over 30 and 40 percentage points in $T_{60}$=0.6 and 0.8 s, respectively). The improvement is comparable to that obtained with the IRM strategy.

Several speech de-reverberation algorithms have been proposed in order to improve the quality or intelligibility of reverberant speech (e.g., see Huang et al., 2007; Naylor and Gaubitch, 2010). However, little is known about the effectiveness of such algorithms in improving speech intelligibility for CI users. In addition, existing dereverberation algorithms are computationally expensive, which makes their integration into CIs a formidable task.

Regardless of the speech coding strategy used in CI devices, most CI users are able to achieve open-set speech recognition scores of 80% or higher in quiet anechoic conditions. However, current speech coding strategies in CIs perform poorly in the presence of noise or reverberation. For example, advanced combination encoder (ACE) which is one of the most commonly used speech coding strategies in CI processors, selects only a subset of channels (8-12) for stimulation at each analysis window. It operates based on the principle that only peaks of speech in the short-term spectrum are sufficient for speech identification. Therefore, during the unvoiced segments (e.g., stops) of the reverberant utterance, where the reverberation overlap-masking effect dominates, the ACE strategy mistakenly selects the channels containing reverberant energy, since those channels have the highest energy.

Binary masking refers to algorithms that decompose the signal into T-F units and select those units satisfying a given criterion (e.g., SNR>0 dB, for noise suppression), while discarding the rest by applying a binary mask to the units of the decomposed signal, i.e., the mask for a given T-F unit is set to 0 if it does not satisfy a given criterion or is set to 1 if it satisfies the criterion. Binary masks have been widely used for different speech enhancement as well as sound separation applications resulting in gains in intelligibility and quality of the processed noisy speech. Use of the binary masks for dereverberation is attractive as it does not rely on the inversion of the RIR. Thus there is a need for a method that can improve the intelligibility of reverberant speech for cochlear implant users.

SUMMARY OF THE INVENTION

An embodiment of the invention provides a method for enhancing reverberant speech recognition performance for CI users, the method comprising the steps of: computing a residual signal using linear prediction analysis; calculating the energy of a reverberant signal; comparing the energy of a reverberant signal with the energy of the residual signal; estimating a binary mask from the comparison of the two signals at different frequency bins with an adaptive threshold; and updating the adaptive threshold for each successive frame of speech by using the energy ratios of the two signals.

An embodiment of the invention is directed to a single channel mask estimation method capable of improving reverberant speech identification for CI users. The method is based on the energy of the reverberant signal and the residual signal computed from linear prediction (LP) analysis. The mask is estimated by comparing the energy ratio of the two signals at different frequency bins with an adaptive threshold. As the threshold is updated for each frame of speech based on the energy ratios of the reverberant and LP residual signals computed from previous frames, it is amenable for real-time implementation. It can thus be used as a specialized (for reverberant environments) sound coding strategy used for cochlear implant applications.

BRIEF DESCRIPTION OF THE DRAWINGS

FIG. 1 shows a block diagram of the proposed mask estimation method in accordance with an embodiment of the claimed invention.

DESCRIPTION OF EXEMPLARY EMBODIMENTS

An embodiment of the invention is directed to a method for determining channel-selection criteria to improve speech recognition performance in a cochlear implant. The existing channel-selection criteria are problematic when reverberation is present, especially in unvoiced or low-energy speech segments where the overlap-masking effects dominate. In these segments, the channels containing reverberant energy are selected because they contain the highest energy. In certain embodiments of the claimed invention, only those channels that satisfy the proposed criteria are selected and used for stimulation and the information from the remaining channels is discarded.

An embodiment of the claimed invention is directed to a channel-selection based algorithm. In certain embodiments, the audio signal is processed in short time-frames. The residual signal of the reverberant signal is computed in each frame using linear prediction (LP) analysis and filtered through a 128-channel gammatone filterbank (FIG. 1).

In certain embodiments, the residual-to-reverberant ratio (RRR) is computed for each frame and compared against an adaptive threshold which is updated in each frame according to information gathered from previous frames. If the ratio is less than the threshold, the channel is retained; if not, it is zeroed out and discarded. Waveforms in each frame are gated by 1 or 0 depending on whether the band is selected or not.

In further embodiments of the inventions, the gated waveforms from each band are finally summed to reconstruct the enhanced stimulus presented to the CI users.

In an embodiment of the invention, the channel selection method is used for coping with reverberant conditions and noise masking conditions.

An embodiment of the claimed invention is directed to a method of enhancing reverberant signals for a user of a hearing device, the method comprising the steps of: a) computing a residual signal from a reverberant signal using linear prediction analysis; b) calculating the energy of a reverberant signal; c) comparing the energy of a reverberant signal with the energy of the residual signal; d) estimating a binary mask from the comparison of the two signals at different frequency bins with an adaptive threshold; and e) updating the adaptive threshold for each successive frame of speech by using the energy ratios of the two signals. In certain embodiments of the invention, the hearing device is a cochlear implant.

A further embodiment of the claimed invention is directed to a method for determining a mask value for enhancement of reverberant speech, the method comprising the steps of: a) computing a residual signal from a reverberant signal using linear prediction analysis; b) passing the reverberant and residual signals through a filter bank to produce filtered signals; c) decomposing the filtered signals into time-frequency units; d) obtaining an energy ratio of reverberant to LP residual signal for each T-F unit; e) comparing the energy ratio against an adaptive threshold; f) determining whether the energy ratio is greater than or lower than the adaptive threshold for each T-F unit; and g) determining a mask value for each T-F unit. In certain embodiments, the residual signal is computed by processing the reverberant signal in short time frames. In some embodiments, the time frame is 20 milliseconds.

An embodiment of the claimed invention is directed to a method for obtaining an enhanced audio signal, the method comprising the steps of: a) computing a residual signal from a reverberant signal using linear prediction analysis; b) passing the reverberant and residual signals through a filter bank to produce filtered signals; c) decomposing the filtered signals into time-frequency T-F units; d) obtaining an energy ratio of reverberant to LP residual signal for each T-F unit; e) comparing the energy ratio against an adaptive threshold; f) determining whether the energy ratio is greater than or lower than the adaptive threshold for each T-F unit; g) determining a mask value for each T-F unit; h) applying the mask value to the T-F unit; i) adding the masked signals at different frequency bands; and j) obtaining an enhanced audio signal. In certain embodiments, the residual signal is computed by processing the reverberant signal in short time frames. In some embodiments, the time frame is 20 milliseconds.

Reverberation is present in every-day situations; at home, meeting rooms, classrooms, church or in other words in all enclosed rooms. This makes de-reverberation or removing the reverberation a challenging task. The overlap-masking effect of reverberation causes temporal smearing particularly when a high-energy voiced segment is followed by a low energy consonant. Consequently, the vowel and consonant boundaries become obscured, thus making the use of the lexical segmentation cues for word retrieval challenging. Moreover, this temporal smearing effect causes the maximum selection criterion used in the ACE speech coding strategy to mistakenly select channels during the gaps present in most unvoiced segments of the utterance.

In order to overcome the limitations of the ACE strategy in channel-selection in reverberant environments, a LP channel-selection criterion for reverberation suppression which only uses the information from the reverberant signal is proposed.

Eleven adult post-lingually deafened native speakers of American English CI users with ages ranging from 48 to 77 years (with an average age of 64 yrs) participated in a study that was conducted to validate the channel selection methods of the invention. All eleven subjects were using a Nucleus (Cochlear, Ltd) device and used their devices routinely with a minimum of 1 yr experience with their device.

Three subjects tested were using the Cochlear ESPrit 3G device, six were using the Nucleus Freedom device, and the remaining two were using the Nucleus 5 speech processor. The 11 Nucleus users were temporarily fitted with the SPEAR3 research interface programmed with the ACE speech coding strategy. The Seed-Speak GUI application was used to program the SPEAR3 wearable research processor with the threshold and comfortable levels of each individual user. In order to assess the full potential of the proposed channel-selection criterion in reverberation suppression, and to prevent the number of channels and the stimulation rate (clinically used by the CI users) from affecting performance, the proposed method was evaluated as a preprocessor to the SPEAR3 device used for testing CI subjects. As a result of this implementation, the number of selected channels in each cycle and the stimulation rate remained the same as that used in the clinical speech processor.

The IEEE sentence corpus (IEEE, 1969),was used for the listening tests. The IEEE corpus includes 72 lists each containing 10 sentences (10 sentences/list) with 7-12 words produced by a male speaker. The root-mean-square energy of all sentences is equalized to the same value corresponding to approximately 65 dBA. All sentence stimuli were recorded at a sampling frequency of 25 kHz and down-sampled to 16 kHz.

In order to simulate the reverberant conditions, RIRs recorded by Neuman et al. (2010) were used. They used a Tannoy CPAS loudspeaker inside a rectangular reverberant room with dimensions of 10.06 m×6.65 m×3.4 m (length×width×height) and a source-to-microphone distance of 5.5 m (beyond the critical distance) to measure the RIRs. The original RIRs were obtained at 48 kHz and down-sampled to 16 kHz for this study. The overall reverberant characteristics of the experimental room were altered by hanging absorptive panels from hooks mounted on the walls close to the ceiling. The average reverberation time (averaged at frequencies of 0.5, 1, and 2 kHz) of the room before modification was 0.8 s with a direct-to-reverberant ratio (DRR) of −3.00 dB. With nine panels hung, the average reverberation time was reduced to approximately 0.6 s with a DRR of −1.83 dB.

To generate the reverberant (Rev) stimuli, the RIRs obtained for each reverberation condition were convolved with the IEEE sentence stimuli (recorded in anechoic conditions) using a standardized linear convolution algorithm in MATLAB.

The main application of this algorithm is for commercial (and FDA approved) CI devices, where currently no algorithm for reverberation suppression is available. It has been shown that reverberation or the reflection of sounds from surfaces of acoustic enclosures significantly degrades the performance (in terms of intelligibility) of hearing-impaired and CI users.

The need for speech de-reverberation for CI users becomes vital especially when reverberation time is beyond 0.3 s (e.g., in some classrooms, halls, church etc). Although there are some de-reverberation methods which improve the quality of reverberant speech, none of them are able to improve the intelligibility of reverberant speech for CI users.

Inverse filtering techniques are the most widely used methods for speech de-reverberation. In order to use such techniques, however, RIRs should be blindly estimated which is a challenging task. The other issue regarding inverse filtering is the non-minimum phase nature of some RIRs that cause difficulties in RIR inversion.

Unlike most speech de-reverberation methods, the proposed technique does not rely on any inverse filtering, which is usually challenging as there is no access to the RIR.

The main advantage of the proposed algorithm is its simplicity and potential of being implemented in real-time. The other advantage of the proposed method is improving the intelligibility of reverberant speech under highly reverberant conditions (higher than 0.5 s reverberation time), where in some cases the CI users performance reaches 50% below their performance under anechoic (no reverberation) conditions.

The method needs only the computation of the LP residual of the reverberant signal, which is quite straightforward. This ensures that the method can be implemented in real time. In fact, the method does not need any challenging algorithm implementation such as RIR estimation or reverberation time estimation and has been found to remove reverberation in highly reverberant environments where most de-reverberation methods fail. Furthermore, the method is general and does not rely on any particular assumption about the properties of the room. Finally, one of the most important features that makes the current method novel over the prior art is its use of binary masks for de-reverberation.

A block diagram of the proposed mask estimation method is depicted in FIG. 1. First the LP residual of reverberant signal (r(t)) is obtained using $10^{th}$ order LPC analysis from 20 ms frames with 50% overlap. The reverberant and LP residual (l(t)) signals are then passed through a 128 channel gammatone filterbank. The center frequencies of each filter are set according to measurements of the equivalent rectangular bandwidth (ERB) of the human auditory filter and are quasi logarithmically spaced proportional to their bandwidths from 50-8,000 Hz.

Framing is then applied to the band-passed filtered signals of both reverberant and LP residual signals using 20 ms frames with 50% overlap which decompose both signals into time-frequency (T-F) bins ($l_{T\text{-}F}$ and $r_{T\text{-}F}$).

The energy ratio of reverberant to LP residual signal is obtained for each T-F unit and is compared against an adaptive threshold ($T_r$). If this ratio is greater than the threshold the mask value is set to 1 otherwise it is set to zero.

$$E(t, f) = \frac{E_r(t, f)}{E_l(t, f)} \quad (1)$$

$$m(t, f) = \begin{cases} 1 & \text{if } E(t, f) > Tr(t, f) \\ 0 & \text{otherwise} \end{cases} \quad (2)$$

where t, f, $E_r$ and $E_l$ are time frame and frequency indices, reverberant and LP residual energies, respectively.

The threshold is set adaptively based on the energy ratio of reverberant and LP-residual signals in a few previous frames as:

$$Tr(t, f) = \alpha \cdot \frac{\sum_{i=1}^{N} E(t - i + 1, f)}{N} \quad (3)$$

Where α is an empirical coefficient close to 1 (1.05) and N is the number of previous frames used for averaging.

This mask is then applied to the T-F units of reverberant signal resulting in zeroing out the T-F units where reverberation is dominant. The masked band-passed filtered signals are then time-reversed, passed through a gammatone filter, time-reversed again and then summed across all bands to obtain the enhanced signal ($\tilde{x}$).

The present invention has been shown and described with reference to the foregoing exemplary embodiments. It is to be understood, however, that other forms, details and embodiments may be made without departing from the spirit and scope of the invention that is defined in the following claims.

What is claimed is:

1. A method for determining a mask value for enhancement of reverberant speech, the method comprising the steps of:

a) computing a residual signal from a reverberant signal using linear prediction analysis;
b) passing the reverberant and residual signals through a filter bank to produce filtered signals;
c) decomposing the filtered signals into time-frequency units;
d) obtaining an energy ratio of reverberant to LP residual signal for each T-F unit;
e) comparing the energy ratio against an adaptive threshold;
f) determining whether the energy ratio is greater than or lower than the adaptive threshold for each T-F unit; and
g) determining a mask value for each T-F unit.

2. The method of claim 1, wherein the residual signal is computed by processing the reverberant signal in short time frames.

3. The method of claim 2, wherein the time frame is 20 milliseconds.

4. A method for obtaining an enhanced audio signal, the method comprising the steps of:

a) computing a residual signal from a reverberant signal using linear prediction analysis;
b) passing the reverberant and residual signals through a filter bank to produce filtered signals;
c) decomposing the filtered signals into time-frequency T-F units;
d) obtaining an energy ratio of reverberant to LP residual signal for each T-F unit;

e) comparing the energy ratio against an adaptive threshold;

f) determining whether the energy ratio is greater than or lower than the adaptive threshold for each T-F unit;

g) determining a mask value for each T-F unit;

h) applying the mask value to the T-F unit;

i) adding the masked signals at different frequency bands; and j) obtaining an enhanced audio signal.

5. The method of claim 4, wherein the residual signal is computed by processing the reverberant signal in short time frames.

6. The method of claim 5, wherein the time frame is 20 milliseconds.

* * * * *